US006931324B2

(12) United States Patent
Taner et al.

(10) Patent No.: US 6,931,324 B2
(45) Date of Patent: Aug. 16, 2005

(54) METHOD FOR DETERMINING FORMATION QUALITY FACTOR FROM SEISMIC DATA

(75) Inventors: M. Turhan Taner, Houston, TX (US); Sven Treitel, Tulsa, OK (US)

(73) Assignee: RDSPI, L.P., Houston, TX (US)

( * ) Notice: Subject to any disclaimer, the term of this patent is extended or adjusted under 35 U.S.C. 154(b) by 0 days.

(21) Appl. No.: 10/687,129

(22) Filed: Oct. 16, 2003

(65) Prior Publication Data

US 2005/0086005 A1   Apr. 21, 2005

(51) Int. Cl.$^7$ ............................................. G01V 1/28
(52) U.S. Cl. .................................................... 702/17
(58) Field of Search ..................... 702/17, 14; 367/73, 367/74

(56) References Cited

U.S. PATENT DOCUMENTS 5,724,309 A    3/1998   Higgs et al.

OTHER PUBLICATIONS

Taner, M., "Joint Time/Frequency Analysis, Q Quality Factor and Dispersion Computation Using Gabor-Morlet Wavelets or the Gabor- Morlet Trans.", Rock Solid Images, Jan. 2002.

Fatti, J. et al., "Detection of gas in sandstone reservoirs using AVO analysis. A 3-D seismic case history using the Geostack technique", Geophysics v. 59, No. 9, Sep. 1994.

*Primary Examiner*—Donald McElheny, Jr.
(74) *Attorney, Agent, or Firm*—Richard A. Fagin

(57) ABSTRACT

A method is disclosed for calculating the quality factor Q from a seismic data trace. The method includes calculating a first and a second minimum phase inverse wavelet at a first and a second time interval along the seismic data trace, synthetically dividing the first wavelet by the second wavelet, Fourier transforming the result of the synthetic division, calculating the logarithm of this quotient of Fourier transforms and determining the slope of a best fit line to the logarithm of the quotient.

12 Claims, 4 Drawing Sheets

METHOD FOR DETERMINING FORMATION QUALITY FACTOR FROM SEISMIC DATA

STATEMENT REGARDING FEDERALLY SPONSORED RESEARCH OR DEVELOPMENT

The present invention was made pursuant to contract number DE-FC26-01BC15356 with the United States Department of Energy. The United States Government retains certain rights in the invention.

CROSS-REFERENCE TO RELATED APPLICATIONS

Not applicable.
Not applicable.

BACKGROUND OF THE INVENTION

1. Field of the Invention

The invention relates generally to the field of seismic data processing and interpretation. More specifically, the invention relates to methods for determining the quality factor (O) from seismic data.

2. Background Art

Seismic exploration techniques are used to locate subsurface earth formations that are likely to produce economically useful materials such as petroleum. Seismic exploration techniques include deploying one or more seismic energy sources near the earth's surface and deploying an array of seismic sensors at or near the surface in the vicinity of the one or more seismic sources. Seismic energy propagates downwardly from the source, where it may be reflected by subsurface acoustic impedance boundaries. The reflected seismic energy is detected by an array of sensors. The sensors generate electrical and/or optical signals corresponding to the detected seismic energy. The signals are typically recorded for processing.

Seismic processing known in the art includes determining structures of the subsurface earth formations. Typically, structures are inferred by analysis of the two-way travel time of the seismic energy from the source to the various reflective boundaries beneath the surface and back to the sensors at or near the surface.

It is also known in the art to determine various petrophysical properties of the subsurface earth formations by analysis of the frequency content of the detected seismic energy and the phase and amplitude relationships between the seismic energy generated by the source and the seismic energy detected by the sensors. Such analysis includes determining one or more seismic "attributes" of the earth formations. Attributes may be computed prestack or poststack. Prestack means processing prior to summing or "stacking" individual sensor recordings ("traces") according to a predetermined relationship, such as common mid point (CMP) or common depth point (CDP). Poststack refers to processing after individual sensor recordings have been summed or stacked. Poststack attributes include, for example, reflection intensity, instantaneous frequency, reflection heterogeneity, acoustic impedance, velocity, dip, depth and azimuth. Prestack attributes include moveout parameters such as amplitude-versus-offset (AVO), and interval and average velocities. Further, attributes may be categorized either as instantaneous attributes, wavelet attributes or geometrical attributes. Instantaneous attributes are attributes whose values are obtained for each data point in the seismic data or within a small time window of data points (e.g., a few milliseconds), such as amplitude, phase, frequency and power. "Data points" within seismic data typically refers to numbers each representing a value of seismic trace amplitude at the instant in time at which each of the amplitude values is recorded. Wavelet attributes are the instantaneous attributes computed at the maximum point of the envelope. The physical meaning of all the wavelet attributes is essentially the same as their instantaneous attribute counterparts. Geometrical, or interval, attributes are attributes of a seismic trace within a seismic interval. Interval attributes are computed from the reflection configuration and continuity. The following references describe aspects of seismic attributes and their applications.

U.S. Pat. No. 5,226,019 issued to Bahorich states that with reference to seismic attributes, "combining multiple (i.e. two or more) descriptors through addition, subtraction, multiplication and ratio, or other means can also be successfully employed", and suggests the use of "a product of the average instantaneous amplitude and average instantaneous frequency."

U.S. Pat. No. 5,884,229 issued to Matteucci, discloses a statistical method for quantitatively measuring the lateral continuity of the seismic reflection character of any specified location in a subsurface target formation.

U.S. Pat. No. 5,930,730 issued to Marfurt et al., discloses a system for forming a seismic attribute display from calculated measures of semblance and corresponding estimates of true dip and true dip azimuth of seismic traces within an analysis cell.

U.S. Pat. No. 6,012,018 issued to Hornbuckle, relates to a system for identifying volumetric subterranean regions bounded by a surface in which a specific seismic characteristic has a constant value. It is stated in the '018 patent that, "in a geological region where physical characteristics (e.g., the presence of oil or gas) are well-correlated with seismic attributes, (e.g., seismic amplitude data), the identification of a subvolume bounded by a constant-seismic-attribute-value surface may provide a very useful predictor of the volumetric extent of the attribute and hence of the characteristic."

U.S. Pat. No. 5,001,677 issued to Masters, discloses a system, which treats measured attributes derived from seismic data as components of a vector, estimates a background vector representing typical background geologic strata, and then calculates a new attribute. As stated in the '677 patent, the preferred embodiment combines information about P (compressional) and S (shear) impedance contrasts so as to discriminate prospective reservoir strata from surrounding non-reservoir or background strata.

U.S. Pat. No. 5,724,309 issued to Higgs et al, discloses a system in which two new seismic attributes (dip magnitude and dip azimuth) are derived from instantaneous phase. The system comprises determining a spatial frequency value by taking the directional spatial derivative of the instantaneous phase for each of a plurality of x, y, t(z) data points in the seismic data and posting the spatial frequency values to identify changes within the earth's subsurface.

U.S. Pat. No. 5,870,691 issued to Partyka et al., discloses a method for processing seismic data to identify thin beds.

Although it is generally recognized that specific seismic attributes are related to specific subsurface properties, a need continues to exist for advancements in the use of seismic attributes to improve the delineation of subsurface regions of the earth to assist in the exploration and production of oil, natural gas and other minerals. There is continuing interest in methods for analyzing seismic data so as to provide direct indication of the presence of petroleum beneath the earth's surface.

Quality factor (O) is a measure of how earth formations attenuate and disperse acoustic (seismic) energy. Q has been used as a direct indicator of the presence of hydrocarbons, among other uses. Estimation of attenuation of pressure and shear waves is as important as the estimation of interval velocities in the field of seismic data interpretation. Estimates of attenuation of pressure and shear waves provide an additional perspective of the lithology (rock mineral composition) and reservoir characteristics (rock pore space fluid content, fluid composition, fluid pressure and rock permeability to fluid flow).

On the other hand, high frequency seismic energy losses due to absorption reduce the bandwidth of the seismic waves passing through the earth formations, and consequently reduce resolution of the seismic images that can be made from reflection seismic recordings. In one case it is desirable to quantify the attenuation effects and in the second case it is desirable to compensate for the attenuation. Due to the long wavelength and low frequency content of seismic waves, the attenuation effects are usually very small. They can be accurately estimated only over large depth (seismic energy travel) intervals. Measurement over shorter intervals can be noisy to such degree that the interpretations made from such estimates may be questionable. Using Q computation techniques known in the art, many Q values are computed and the results are viewed to detect a causal relationship between the lithology and the formation structures inferred from the seismic section.

There have been a number of methods proposed to calculate Q, mostly based on the power spectral ratio concept. Several of these methods are based on the seismic envelope rise time and on the normalized maximum envelope slope. Spectral ratio methods, while appearing to provide the most reliable results in Q calculation, have tended to be unreliable primarily due to near zero values in the denominator spectrum used in the spectral division step implementing the spectral ratio method.

SUMMARY OF THE INVENTION

One aspect of the invention is a method for calculating the quality factor Q from a seismic data trace. The method includes calculating a first and a second minimum phase inverse wavelet at a first and a second time interval along the seismic data trace, synthetically dividing the first minimum-phase wavelet by the second minimum-phase wavelet, Fourier transforming the result of the above synthetic division and obtaining a quotient spectrum, calculating the logarithm of the result of the above Fourier transformation, and determining the slope of a straight line which best fits the logarithm of the above Fourier quotient spectrum.

Other aspects and advantages of the invention will be apparent from the following description and the appended claims.

DETAILED DESCRIPTION

Figure 1:
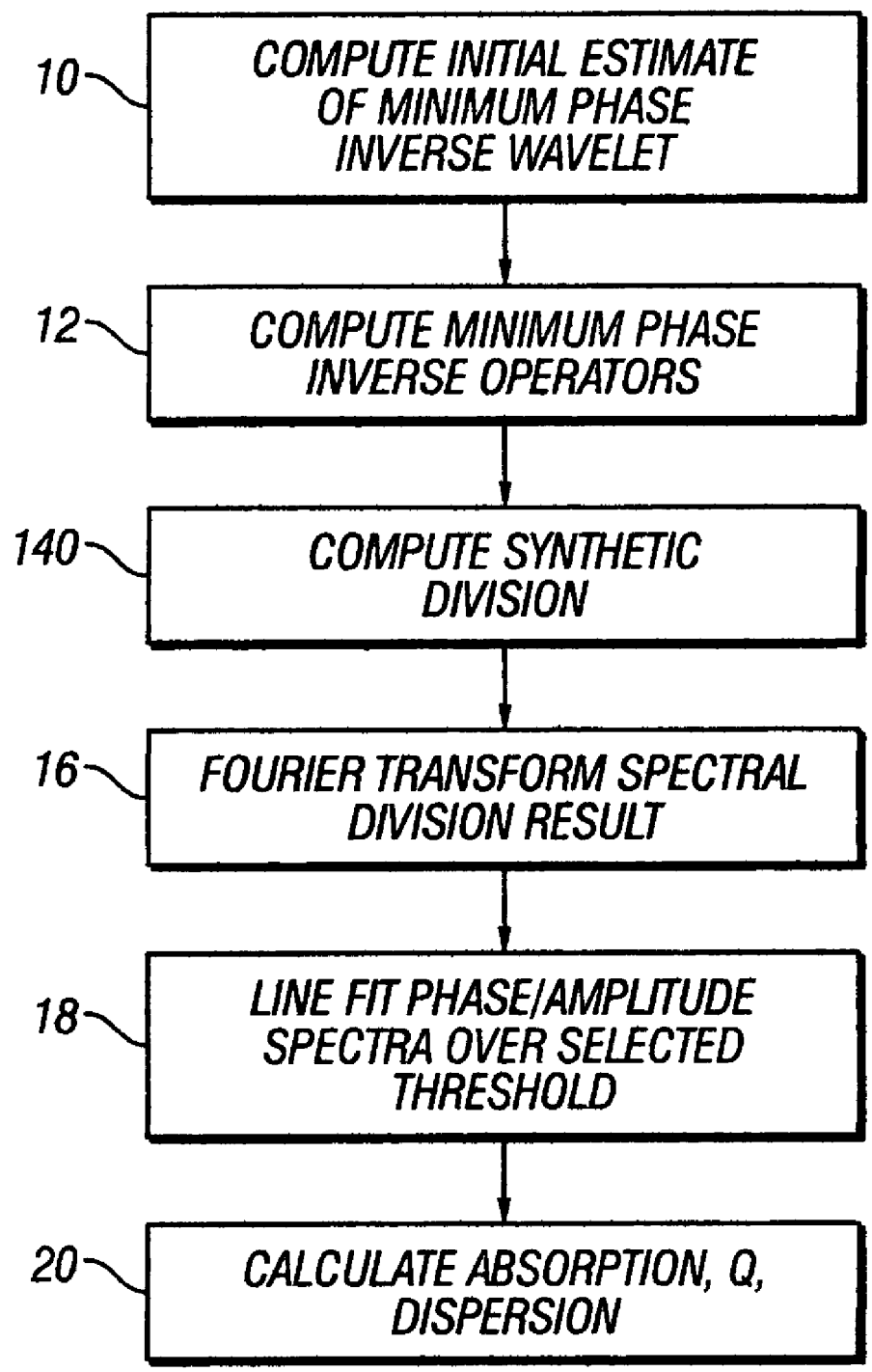
FIG. 1 shows a flow chart of an example process of one embodiment of the invention.

A process according to the invention for determining the quality factor Q from seismic data begins with the assumption of a constant Q condition, that is, the quality factor Q is independent of the frequency, f. In this case, the amplitude spectrum of a seismic wavelet, represented by $A_0$ (f) as it originates from a seismic energy source, will be changed to $A_1$ (f) due to attenuation as shown in the following expression:

$$|A_1(f)| = |A_0(f)| \cdot \exp(-\pi f t/Q) \quad (1)$$

In equation (1), t represents the seismic travel time from the seismic energy source to the target zone of interest. The quality factor Q is estimated from the natural logarithm (ln) of the amplitude spectral ratio of the seismic wavelets estimated above and below the zone of interest:

$$\ln\left|\frac{A_1(f)}{A_0(f)}\right| = -\pi f(t_1 - t_0)/Q \quad (2)$$

where $t_1$ and $t_0$ represent seismic travel times to the bottom and top of the zone of interest, respectively. A particular problem with estimating Q from the log-amplitude spectrum of equation (2) results from the possible occurrence of zero or near-zero values at some frequencies of the denominator, $A_0(f)$. This can give rise to unusable Q values and/or large estimation errors. However, within coherent zones (zones having relatively high signal to noise ratio) the ratio of equation (2) does provide accurate estimates. To take advantage of this fact, methods according to the invention use the amplitude of the spectra as weights in a least squares curve fitting process that estimates Q from the slope of the straight line given by the right hand side of equation (2).

Autocorrelation functions whose z-transforms have roots, or zeroes on or near the unit circle (where the unit circle |z|=1 is a representation of the frequency axis in the complex z-plane) can be due to computational inaccuracies when estimating autocorrelation functions, or they could be due to the effects of various forms of noise, as well as computational artifacts introduced via the use of notch filters.

Because frequency-domain spectral division is equivalent to complex z-plane polynomial division, the desired results can be obtained by dividing a stable numerator z-transform polynomial by a stable denominator z-transform polynomial. In methods according to the invention, the spectral division can be equivalently implemented by z polynomial division. Such stable z-polynomials can be conveniently computed as unit-step prediction error operators, better known as "spiking deconvolution operators." Such a spiking deconvolution operator is identical to the minimum phase inverse wavelet of the minimum phase equivalent of the seismic wavelet estimated in a particular seismic zone of interest. The minimum phase equivalent of a wavelet is a wavelet whose amplitude spectrum is identical to the amplitude spectrum of the seismic wavelet, but whose phase spectrum is minimum phase. Because spiking deconvolution operators are by definition minimum phase, their zero-delay least squares spiking inverses are always stable. Such inverse wavelets can be computed from seismic trace autocorrelation functions by the familiar Wiener-Levinson algorithm. See, for example, Robinson, E. A. and Treitel, S,

*Geophysical Signal Analysis*, Prentice-Hall (1980) for a description of the Wiener-Levinson algorithm.

A computational method according to the invention can be explained as follows. First, minimum phase inverse wavelet estimation is performed. Minimum phase inverse wavelet estimation is a spiking deconvolution operator design procedure well known in the art. Let f(t) represent a seismic trace (seismic signal amplitude with respect to time) and let a(n) represent a spiking deconvolution operator. The spiking deconvolution operators can be computed by minimizing the sum of the squares of the differences between a predicted and an actual seismic trace. A predicted seismic trace for unit prediction distance (i.e., one sampling interval) is generated by convolving the spiking deconvolution operator a(n) with the given seismic trace, f(t). The sum of the squares of the differences between the synthesized traces and the actual traces can be calculated by the following expression:

$$\bar{\varepsilon}^2 = \sum_{t=1}^{T}\left(f(t) - \sum_{n=1}^{N} a(n)f(t-n)\right)^2 = \text{Min} \quad (3)$$

where T is the length of a selected time window, and N is the number of coefficients of the spiking deconvolution operator a(n). The time window may be any convenient subset of a trace, or the entire trace from start to end of the recording. The spiking deconvolution operators are computed by setting the partial derivatives with respect to unknown a(k) equal to zero;

$$\partial \bar{\varepsilon}^2/\partial a(k) = -2\sum_{t=1}^{T} f(t)\cdot f(t-k) + 2\sum_{t=1}^{T} f(t-k)\sum_{n=1}^{N} a(n)f(t-n) = 0 \quad (4)$$

The spiking deconvolution operators a(n) can be determined by the following expression:

$$\sum_{n=1}^{N} a(n)\sum_{t=1}^{T} f(t-n)\cdot f(t-k) = \sum_{t=1}^{T} f(t)\cdot f(t-k) \quad (5)$$

The spiking deconvolution operators a(n) can next be z transformed as shown below:

$$A(z) = [1.0 - a(1)z - a(2)z^2 -$$

$$a(3)z^3 - a(4)z^4 z = e^{-j\Phi(\omega)} \quad (6)$$

where j is the complex constant $\sqrt{-1}$, $\omega$ is the angular frequency and $\Phi$ represents the phase. The operator A(z) is a minimum phase operator. In particular, it is the minimum phase inverse of the minimum phase equivalent of the estimated seismic wavelet. The actual seismic wavelet may or may not be minimum phase. However, because A(z) is minimum phase, it is causal and the logarithm of its amplitude spectrum is equivalent to the Hilbert transform of the its phase spectrum. See, for example, *Statistical Communication and Detection*, E. A. Robinson, Hafner (1967) Appendix 3.

In some instances it may be desirable to observe the spiking deconvolution operator variation continuously with respect to time. In such cases an adaptive scheme can be used that updates the spiking deconvolution operators continuously at each time sample. Examining the square of the local error at any time sample t:

$$\varepsilon^2(t) = \left(f(t) - \sum_{n=1}^{N} a(n)f(t-n)\right)^2 \quad (7)$$

The partial derivative of the square of the error with respect to a(k) will provide the gradient of the error function at time t;

$$\partial \varepsilon^2(t)/\partial a(k) = -2\cdot f(t-k)\cdot\left(f(t) - \sum_{n=1}^{N} a(n)f(t-n)\right) \quad (8)$$

Therefore, a set of spiking deconvolution operators at time t can be updated in the direction of the steepest descent (in order to reach the error squares minimum where all partial derivatives are equal to zero). The steepest descent is in the opposite direction of the local gradient. Therefore the update will be in the form:

$$a^{(t+1)}(k) = a^{(t)}(k) + \beta\cdot\left(f(t) - \sum_{n=1}^{N} a(n)f(t-n)\right)\cdot f(t-k) \quad (9)$$

Here $\beta$ represents what is usually called the "learning rate". It is kept small, on the order of 0.01. An often recommended value is 2/(maximum eigenvalue), the term "eigenvalue" here referring to the eigenvalues of the Toeplitz matrix formed from the estimated trace autocorrelation function. It is interesting to note that the portion within the bracket is the local error at time t. Substituting equation (7) into equation (9) produces the simple and elegant update expression:

$$a^{(t+1)}(k) = a^{(t)}(k) + \beta\cdot\varepsilon(t)\cdot f(t-k) \quad (10)$$

The convergence proof of the foregoing updating scheme to the least mean square solution is known in the art. See, Widrow, B. and Stearns S. D., *Adaptive signal processing*, Prentice-Hall Book Co. (1985).

Having computed minimum phase wavelets by using spiking deconvolution operators as explained above, the next part of the Q computation includes synthetic division to obtain the spectral ratio.

Let a(z), b(z) represent z polynomials of order N and M, respectively. Then the quotient c(z)=a(z)/b(z) can be computed by restating the division as the multiplication a(z)=b(z).c(z) and requiring that like powers of z on both sides of this expression be equal. Such a procedure is called "synthetic division". It should be noted that multiplication of two z-polynomials is the equivalent of convolution in the time domain. Likewise, division of z-polynomials represents deconvolution. Let the z-polynomials be represented by:

$$a(z) = a_0 + a_1 z + a_2 z^2 + a_3 z^3 + a_4 z^4 + \ldots a_N z^N,$$

$$b(z) = b_0 + b_1 z + b_2 z^2 + b_3 z^3 + b_4 z^4 + \ldots + b_M z^M, \text{ and}$$

$$c(z) = c_0 + c_1 z + c_2 z^2 + c_3 z^3 + c_4 z^4 + \ldots + c_K z^K. \quad (11)$$

Now form all products of powers of z, starting with zero power:

$$a_0 = b_0.c_0, \text{ then } c_0 = a_0/.b_0. \quad (12)$$

First power:

$$a_1 = b_1 \cdot c_0 + b_0 c_1, \text{ then } c_1 = (a_q - b_1 \cdot c_0)/b_0. \quad (13)$$

Second power:

$$a_2 = b_2 \cdot c_0 + b_1 c_1 + b_0 c_2, \text{ then } c_2 = (a_2 - b_2 \cdot c_0 - b_1 c_1)/b_0. \quad (14)$$

This recursion can be generalized as:

$$a_n b_n \cdot c_0 + b_{n-1} c_1 + b_{n-1} c_2 + \ldots + b_0 c_n$$

which provides the result:

$$c_n = \left(a_n - \sum_{m=0}^{n-1} b_m c_{n-m}\right) / b_0 \quad (15)$$

The recursion will continue until the desired number of output elements is formed. Since b(z) has only M elements, then the summation should be carried out from 0 up to and including the Mth element of b(z), provided that n−1>M. It should be noted that if a(z)=1, then the c(z) will be the minimum phase inverse of the minimum phase wavelet b(z). If b(z) is not a minimum phase polynomial, the results will be unstable and the magnitude of the coefficients c(z) will increase rapidly and without limit as K increases.

The quality factor Q can now be computed as follows. Start with a minimum phase inverse operator determined from a relatively shallow part of the seismic section, and use this minimum phase inverse operator as the initial part of the updating scheme. Then compute updated minimum phase inverse operators for each time sample and save some subset of or all of the computed minimum phase inverse operators. This will generate a table of minimum phase inverse operators with respect to time. Then perform synthetic division between successive minimum phase inverse operators within a selected, constant time interval and save the resulting quotients. These quotients will then contain the information from which Q can be estimated.

The logarithm of the Fourier transform of these quotients yields the logarithmic amplitude decay and the associated phase difference over the selected trace time interval. Next fit a least squares straight line to the significant (i.e., containing spectral energy above a minimum pre-selected threshold) portion of the Fourier transformed data to determine the estimate of the quality factor, Q. Recall that these Q values are determined over an interval. A method according to one embodiment of the invention is explained below with reference to FIG. 1 and includes the following computational steps.

1) Compute an initial estimate of a minimum phase inverse wavelet to be used as the starting template, A(0) as shown at 10.

2) Compute minimum phase inverse operators by the adaptive process explained above, or calculate one minimum phase inverse operator per user selected time window, as shown at 12. One operator per sample or one operator per window are stored for later synthetic division.

3) Compute synthetic divisions over a user chosen time interval, moving one sample or one interval at a time, as shown at 14. Store the division results as time samples c(t).

4) Compute a Fourier transform of the time samples of c(t), as shown at 16.

$$C(\omega) = \sum_{t=1}^{K} c(t) \cdot \exp(-i\omega t) \cdot \Delta t \quad (16)$$

5) Compute the logarithm of the Fourier transform to obtain log amplitude and phase spectra of the c(t) operator, as shown at 18:

$$\ln C(\omega) = \ln |A(\omega)| + i\Phi(\omega) \quad (17)$$

Because c(t) represents a minimum phase wavelet, then the real and the imaginary parts of the logarithm of each spectrum are Hilbert transforms of each other. The slope of the least squares straight line fitted to the real part will yield an estimate of the absorption via the quality factor Q, while the imaginary part (the phase part) will produce an estimate of the dispersion associated with the absorption occurring over the same time interval.

6) Fit least squares straight lines over the zones where the amplitude spectrum is above a selected mean threshold to obtain the absorption and dispersion coefficients, as shown at 18. The absorption coefficient (dB/cycle) minimizes the following relationship:

$$\sum_{\omega=\omega_1}^{\omega_2} w(\omega) [20 \log_{10} |A(\omega)| - \alpha \cdot \Delta t \cdot \omega - b]^2 = \varepsilon^2 \quad (18)$$

where w(ω) is a frequency and amplitude spectrum magnitude dependent weight function.

The Q quality factor (a dimensionless ratio) is provided by the expression:

$$\sum_{f=f_1}^{f_2} w(f) [\ln |A(f)| - \pi \cdot \Delta t \cdot f / Q - b]^2 = \varepsilon^2 \quad (19)$$

where f=ω/2π and f1 and f2 are starting and ending frequencies, respectively.

The dispersion coefficients β and b are computed by minimizing the following expression;

$$\sum_{\omega=\omega_1}^{\omega_2} w(\omega) [|\phi(\omega)| - \beta \cdot \Delta t \cdot \omega - b]^2 = \varepsilon^2 \quad (20)$$

The quality factor, Q, indicating absorption, and the phase dispersion curve are computed from equations (18), (19) and (20) in the conventional manner, as shown at 20 in FIG. 1. Because the low amplitude portions of the spectra are more susceptible to noise, the weight function w is preferably chosen to more heavily weight the higher amplitude portions of the spectra into the computation.

7) Finally, repeat the computations shown on step 6 for all of the data samples. This will generate 3 different output traces per input seismic trace. Finally, repeat the foregoing computations for all traces in a selected data volume to generate Q, i.e., absorption and dispersion sections.

Implementation of the foregoing procedure to calculate absorption, Q and dispersion coefficients in a practical computer program can be explained as follows, and with reference to FIG. 2. An embodiment of the program includes simultaneous processing of five in-line traces and a selected, larger number of cross-line traces at one time. As the computation progresses, one in-line trace is dropped and one in-line trace is added to the computation. This will allow processing an essentially unlimited number of in-lines. The beginning and the end of a particular calculation will contain less than five in-line traces. These special cases can be handled by specifically coded subroutines. Data are processed in the present embodiment as groups of five by five traces. The center-trace is referred to as the "pivot point trace." All computations are performed with respect to the pivot point trace. Computed results are stored at the point (geographic or trace coordinates) of the pivot point trace. This is shown at 22 in FIG. 2.

Data are then scanned in both in-line and cross-line directions to determine the structural dips of seismic events. These dips dt/dx and dt/dy are stored for autocorrelation and later averaging use. Calculating and storing the structural dips enables calculation of Q values over essentially the same formations in each of the traces in the five by five group, accounting for the fact that formations frequently have non-zero dip. In some embodiments, zero crossings of the pivot trace are picked and stored. Taking the zero crossing times of the pivot point trace as a basis, zero crossings of each trace in the five by five trace group are then predicted by the structural dips, and these predicted zero crossings are then stored. This is shown at 24 in FIG. 2.

An autocorrelation window is formed starting at the first picked zero crossing time on the pivot point trace, in one embodiment. In another embodiment, a starting time is selected on the pivot point trace of a first selected-length time window and autocorrelations are computed in each window. The starting time for the autocorrelation window in each of the other traces in the five by five trace group are computed based on the structural dips calculated earlier. In one embodiment, the autocorrelation window can be about 200 to 400 milliseconds duration.

The computed autocorrelations are then scaled to be unity at zero lag and are finally summed along the structural dip. This is shown at 26 in FIG. 2. If autocorrelation fails to produce a stable minimum phase inverse operator, at 28, then the process moves to the next zero crossing, in one embodiment. In another embodiment, the process moves the autocorrelation time window by a selected time increment such increment being one or more than one data samples apart from the previous window position. The process then returns, in both the foregoing embodiments, to computing the autocorrelation, as shown at 30.

Figure 2:
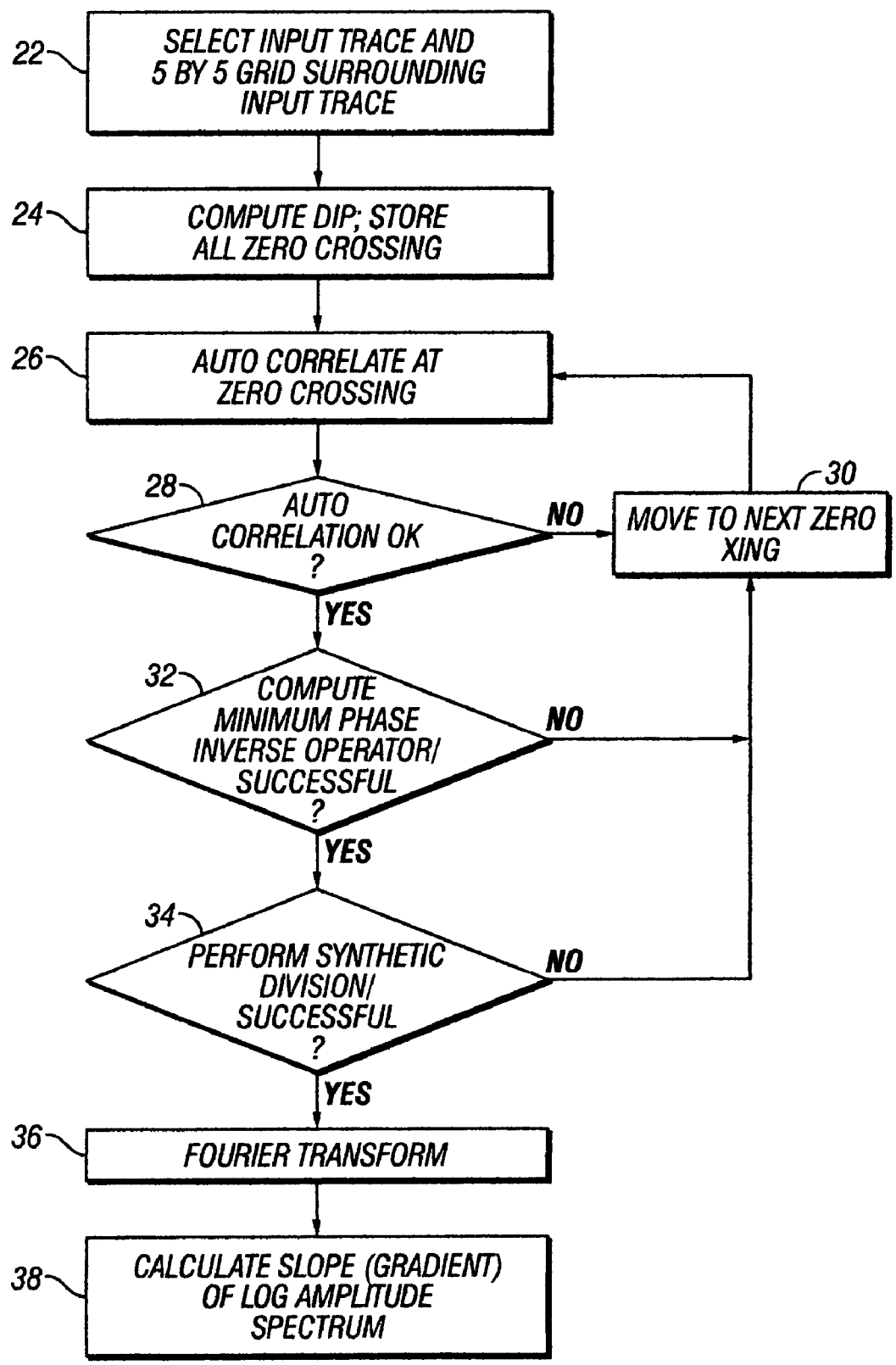
FIG. 2 shows a flow chart of another example process according to the invention.

If autocorrelation is successful, it will produce an acceptable minimum phase inverse operator for each successful autocorrelation function, at 32 in FIG. 2. If the minimum phase inverse operator computation is not successful, then a record is made of any and all failed minimum phase computations, and the process moves to the next autocorrelation time window (or zero crossing), at 30 in FIG. 2.

At 34 in FIG. 2, if minimum phase inverse computation is successful, then the process performs synthetic division. If the synthetic division fails, a record is made of the failure, and the process moves to the next zero crossing or autocorrelation computation window, at 30 in FIG. 2, and then returns to the autocorrelation calculating at 26. If the synthetic division is successful, the results of synthetic division now contain Q effects. The process then performs a Fourier transform and computes the amplitude spectrum, at 36 in FIG. 2.

The logarithm of the spectral ratio is required for the Q computation. Q values are determined from the gradient of the log amplitude spectra, at 38 in FIG. 2, over several shorter frequency windows, and the most consistent result is selected as the final computed Q value, and written to the output trace. The computed Q value is preferably checked to determine if it is between the physically reasonable limits between about 3 and 300. If the computed Q is outside this range, a value of 300 can be selected to replace the computed Q value at the particular output sample time. The final Q values are stored at data samples between the zero crossings, in one embodiment, or at selected computation time increments in another embodiment. The foregoing process is repeated until all traces in the center in-line are processed. Once the center in-line is finished, one in-line is removed in the cross line direction and a new in line is added to the circular stack, so the next in-line in the cross line direction then becomes the line on which all the pivot point traces are located. This will be repeated for the whole 3-dimensional seismic data volume to be processed.

Figure 3:
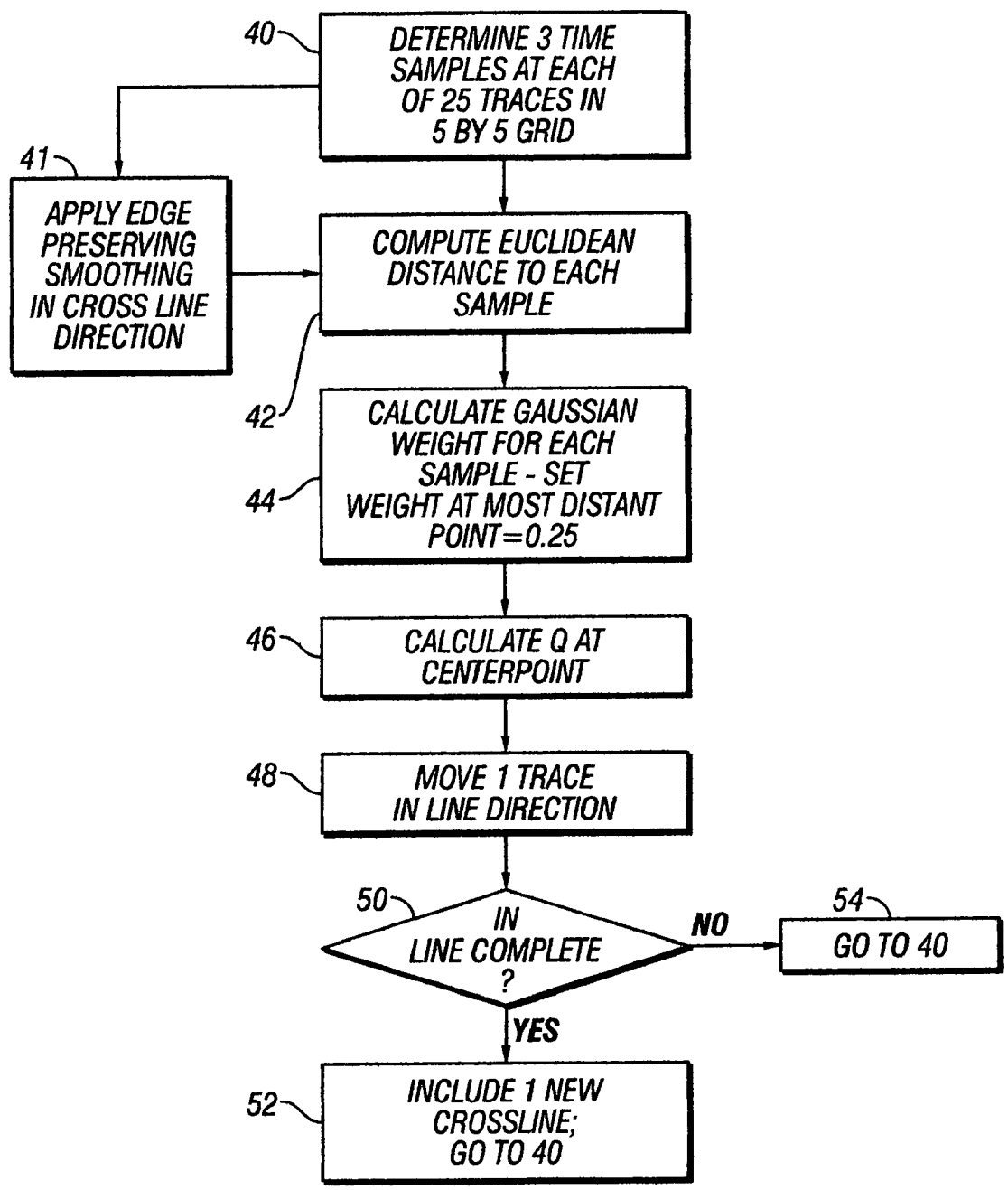
FIG. 3 shows a flow chart of an embodiment of averaging technique according to the invention.

In some embodiments, and referring to FIG. 3, the Q values are averaged from a five by five set of traces along the structural dips calculated earlier. On each trace, three values along the time direction are used in the averaging procedure, as shown at 40 in FIG. 3. This will result in a total of 75 time samples to be averaged. The center trace in the fiveby fivetrace group is again set up as the pivot point trace. Each trace distance is computed as a unit distance. A Euclidean distance is computed between each time sample point on the center trace and each of the 75 sample points, as shown at 42 in FIG. 3. These distances are used to compute a Gaussian weight for each Q value at each sample point, where the weight is set to 0.25 for the farthest distance, as shown at 44 in FIG. 3. If the calculated Q value at the center point is within the accepted range, it goes into the averaging. If the center value is outside the acceptable range, occurrence analysis and averaging are performed for acceptable and unacceptable Q values separately and results are compared, at 46 in FIG. 3. The one with the highest occurrence wins and dictates the final Q value. Averaging is done using 1/Q values.

Optionally, the edge preserving smoothing can be applied, as shown at 41, to traces in the five by five group in the cross-line and in-line direction from the pivot point trace. At 48, after computation of Q values on the pivot point trace, the process is moved one trace in the in-line direction. At 50, if the in-line is complete, one new cross-line of traces is added and one cross-line of traces is dropped from the computation, essentially moving the in-line for which computations are performed one trace in the cross-line direction. Then the entire process is repeated along the new in-line, at 40. If the in-line is not completed, the entire five by five trace (five traces each in line direction and fivetraces each cross line direction, working with five in lines at a time) group is moved one trace in the in-line direction and the procedure is repeated at 40. It should be clearly understood that the foregoing procedure can alternatively be applied in the cross-line direction, whereby computation of Q values at a pivot point trace can be followed by moving one trace in the cross-line direction, and repeating the process until a cross-line is finished. Then a new in-line can be added, and an in-line dropped along the cross-line direction.

Figure 4:
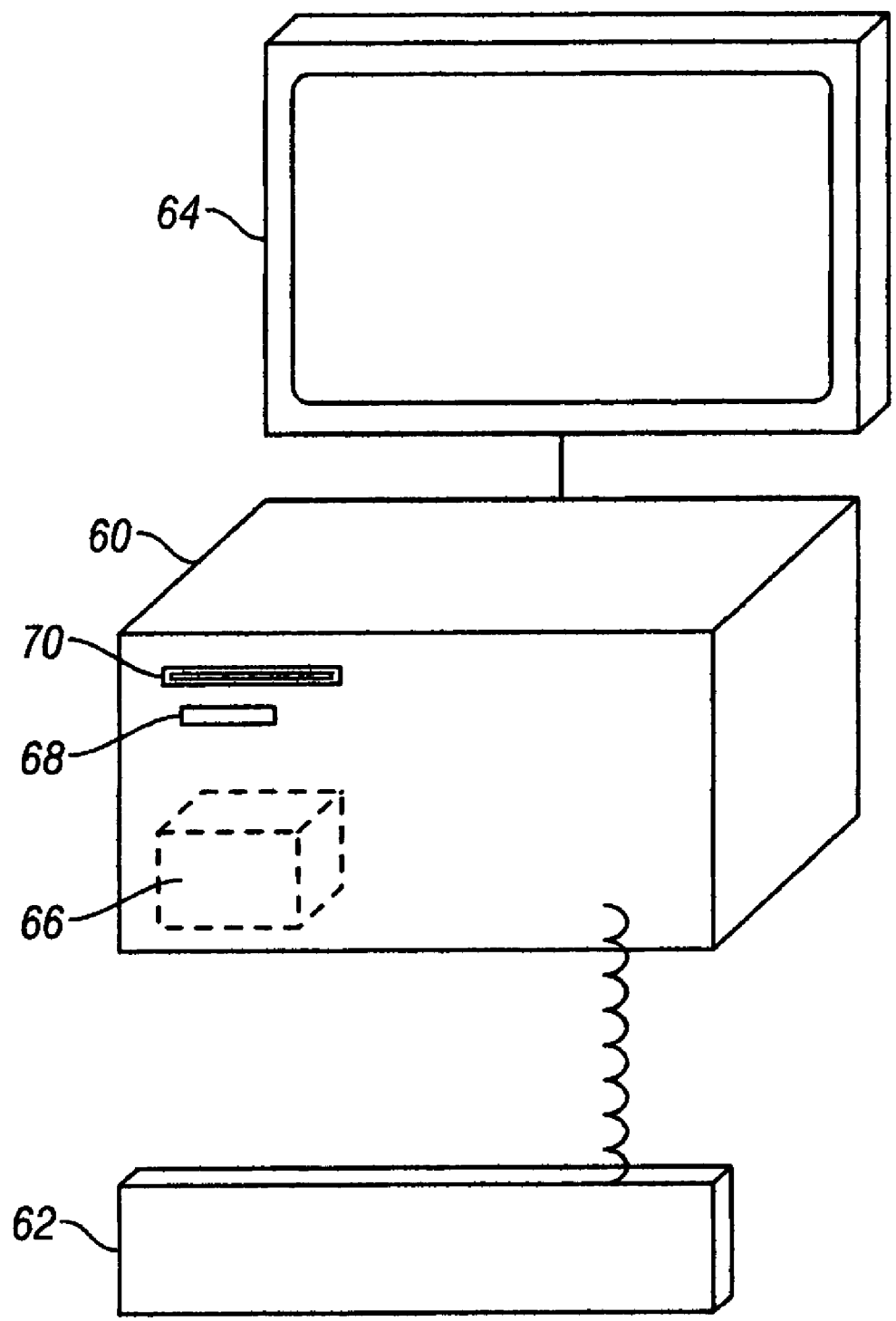
FIG. 4 shows a general purpose, programmable computer adapted to read stored logic operable to cause the computer to perform methods according to the invention.

Referring to FIG. 4, the foregoing processes can be embodied in computer-readable code stored on a computer readable medium, such as floppy disk 68, CD-ROM 70 or magnetic hard drive 66 forming part of a general purpose programmable computer. The computer, as known in the art, includes a central processing unit 60, a user input device such as a keyboard 62 and a user display 64 such as a flat panel LCD display or cathode ray tube display. According to this aspect of the invention, the computer readable medium includes logic operable to cause the computer to execute steps as set forth above and explained with respect to FIGS. 1–3.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for calculating seismic quality factor from a seismic data trace, comprising:
   calculating a first and a second minimum phase inverse wavelet at a first and a second time interval along the seismic data trace;
   synthetically dividing the first wavelet by the second wavelet
   Fourier transforming a result of the synthetically dividing;
   calculating a logarithm of a result of the Fourier transforming; and
   determining a slope of a best fit line to the logarithm of the amplitude result of the Fourier transform.

2. The method of claim 1 further comprising averaging quality factor values over a selected number of seismic traces adjacent the seismic data trace along a structural dip determined by calculating a time displacement of correlative events between the adjacent traces.

3. The method of claim 2 further comprising averaging quality factor values over a selected number of time samples adjacent a selected time sample in each of the seismic data trace and the adjacent traces.

4. The method of claim 3 further comprising determining a Euclidean distance from a selected time sample in the seismic data trace to each of the selected time samples in the adjacent traces, and assigning a Gaussian weight based on each Euclidean distance.

5. The method of claim 4 wherein the Gaussian weight at a largest one of the Euclidean distances is set to about 0.25.

6. The method of claim 1 further comprising adaptively updating the first and second minimum phase inverse wavelets with respect to time.

7. A computer program stored in a computer readable medium, the program having logic operable to cause a computer to perform a method for calculating seismic quality factor from a seismic data trace, the logic operable to cause the computer to perform:
   calculating a first and a second minimum phase inverse wavelet at a first and a second time interval along the seismic data trace;
   synthetically dividing the first wavelet by the second wavelet
   Fourier transforming a result of the synthetically dividing;
   calculating a logarithm of a result of the Fourier transforming; and
   determining a slope of a best fit line to the logarithm of the amplitude result of the Fourier transform.

8. The computer program of claim 7 further comprising averaging quality factor values over a selected number of seismic traces adjacent the seismic data trace along a structural dip determined by calculating a time displacement of correlative events between the adjacent traces.

9. The computer program of claim 7 further comprising averaging quality factor values over a selected number of time samples adjacent a selected time sample in each of the seismic data trace and the adjacent traces.

10. The computer program of claim 7 further comprising determining a Euclidean distance from a selected time sample in the seismic data trace to each of the selected time samples in the adjacent traces, and assigning a Gaussian weight based on each Euclidean distance.

11. The computer of claim 8 wherein the Gaussian weight at a largest one of the Euclidean distances is set to about 0.25.

12. The computer program of claim 7 further comprising adaptively updating the first and second minimum phase inverse wavelets with respect to time.

* * * * *